United States Patent [19]

Ramusino

[11] 4,226,561
[45] Oct. 7, 1980

[54] MILLING MACHINE FOR USE IN RESTRICTED RECESSES

[75] Inventor: Francesco C. Ramusino, Milan, Italy

[73] Assignee: Innocento Santeustacchio S.p.A., Brescia, Italy

[21] Appl. No.: 888,240

[22] Filed: Mar. 20, 1978

[30] Foreign Application Priority Data

May 27, 1977 [IT] Italy .............................. 24063 A/77

[51] Int. Cl.³ ......................... B23C 5/26; B23Q 5/22
[52] U.S. Cl. .................................. 409/232; 409/904
[58] Field of Search ................... 90/11 R, 11 A, 14; 408/22, 26, 234; 29/565

[56] References Cited

U.S. PATENT DOCUMENTS

| | | | |
|---|---|---|---|
| 3,045,510 | 7/1962 | Brainard | 90/11 A X |
| 3,058,559 | 10/1962 | Ohrnberger | 90/11 A X |
| 3,295,415 | 1/1967 | Muller | 90/11 R |
| 3,383,958 | 5/1968 | Mottu | 90/11 R X |
| 3,548,711 | 12/1970 | Baldwin | 90/11 A |
| 4,012,818 | 3/1977 | Dornblüth et al. | 90/11 A |

*Primary Examiner*—Horace M. Culver
*Attorney, Agent, or Firm*—Birch, Stewart, Kolasch & Birch

[57] ABSTRACT

The present invention is directed to a milling machine, including a base member, a substantially vertically disposed element which is horizontally adjustable along said base member, a clamping platform disposed adjacent the base member, a machine head which is vertically adjustable along the vertically disposed element, a tubular ram mounted in the machine head, said tubular ram being adjustable transversely to the vertically disposed element, toward and away from the clamping platform, a milling tool spindle adapted to rotate around its longitudinal axis and a drive means for rotation of the milling tool spindle and for integrally moving the ram and spindle away from and toward the platform. Advantageously a first, short guide means is disposed in an aperture of the front wall of the machine head and a second guide means is disposed in the inner side of the cavity of the same machine head, said second guide means being disposed between a wall of the cavity and a counterfaced wall of the housing of the spindle driving means. Also, the spindle driving means is supported by the tubular ram, in which the spindle is axially mounted and the tubular ram is axially displaceable with respect to the machine head without jeopardizing the stiffness of the working system and the precision of the machine.

4 Claims, 4 Drawing Figures

MILLING MACHINE FOR USE IN RESTRICTED RECESSES

The present invention is directed to a milling machine of the type which has the following features: an upright* element which is horizontally adjustable along a base; a head which is vertically adjustable along the upright element; a tubular ram mounted cross-wire to the upright and adapted to move away from and toward the face plate platform; a spindle for milling tools with support which rotates on its longitudinal axis in the tubular ram with which it is transversely integral; and a drive system to rotate the spindle so as to move it and the ram integrally away from and toward the face plate platform.

* i.e., a vertical post; GFE

In milling machines of this type the approach of the milling spindle to the work has been, until now, accomplished essentially by either of two systems:

(A) MOVABLE HEAD SYSTEM

In this system the head of the milling machine is mounted on the upright so that, besides being vertically adjustable along the upright, it is also adjustable horizontally away from and toward the face plate platform. The milling spindle, as well as the drive system provided for its working movement, are rigidly supported by the head and they move integrally with it. This system has the advantage of having very reduced play, if any, in the linkage between the milling spindle and the respective drive system. Another advantage is the highly desired rigidity of the spindle during the operating phase. These advantages are such as to guarantee good results from the milling machine especially in high power milling.

In spite of these important advantages the movable head system has a technical disadvantage, not overcome until now, consisting of the fact that during milling operations in tight recesses, and in similar circumstances, significant obstructions occur and, therefore, the operations are difficult to perform. This is caused by the large over-all dimensions of the head and by the fact that the head must necessarily approach the work in such operations.

(B) FIXED HEAD AND ADJUSTABLE SPINDLE SYSTEM

In this system the head of the milling machine is supported by the machine's upright and may be adjusted vertically only. The milling spindle is mounted within a ram which is slidably supported in the head which may be adjusted in a horizontal direction away from and toward the face plate platform. The spindle may be rotated around its own longitudinal axis (working motion) while it is integral to the ram in its straight-line axial movements. The drive systems and the related kinematic devices for the working motion of the spindle are firmly supported by the head.

In this system there is a noteworthy advantage, that is, the workpiece is approached by an element (milling spindle) of reduced dimensions, for which reason it is possible to carry out the milling with relative ease, even in rather small recesses. But, in this same system there is the necessity of a connection of the sliding-keying type, between the spindle and the respective drive system, for which reason undesirable play and elasticity occur, resulting in a serious disadvantage in the machining process. Another disadvantage resides in the fact that during the operation of the machine, the unit composed of the ram-milling spindle is essentially supported by an overhang, with the length of the indentation being necessarily reduced, and, therefore, the rigidity of this unit is undesirable.

The present invention is directed to producing a milling machine which has the structural characteristics and functions such that the approach of the milling spindle to the workpiece occurs in a system which combines the advantages individually achieved in the two systems described above, while overcoming the known disadvantages at the same time.

The present invention resolves this problem because of the fact that the drive system for setting the milling tool spindle into rotation is mounted as a unit on the tubular ram and is movable with it away from and toward the clamping platform, the head being furnished with a cavity which is externally accessible and which extends in the direction of movement of the tubular ram for a distance which is not less than the traveling distance of the ram itself with respect to the head, the head also having appropriate transverse dimensions for allowing the movement of the drive system which is integral with the ram. The main advantage achieved by the present invention resides in the fact that, at the time of a desired milling operation, the approach of the operating tools to the workpiece is obtained by the movement of a unit, composed of the tubular ram-milling spindle, with reduced transverse dimensions, for which reason the milling operations in relatively restricted recesses are rendered easier to perform. Another advantage resides in the fact that the drive system of the spindle is mounted as a unit on the corresponding tubular ram, and therefore the linkage between the drive system and the spindle is realizable, without resorting to slide-keying, resulting in the great advantage of obtaining the desired rigidity and the likewise desirable absence of play.

Another advantage of this system rests in the fact that the concept of the invention expressed above may be extended and easily applied to a milling-boring machine, that is, a machine in which, inside the milling spindle, which is provided hollow, there is, slidably mounted, and integral in rotation with the milling spindle, a boring spindle whose drive system for the axial movement away from and toward the face plate platform, is supported by the tubular ram and is transversely integral therewith.

Other features and the advantages of the invention will be shown more clearly in the detailed description of an actual example of a milling-boring machine according to this invention, as given below with reference to the attached drawings which are merely indicative and not limiting, in which.

Figure 1:
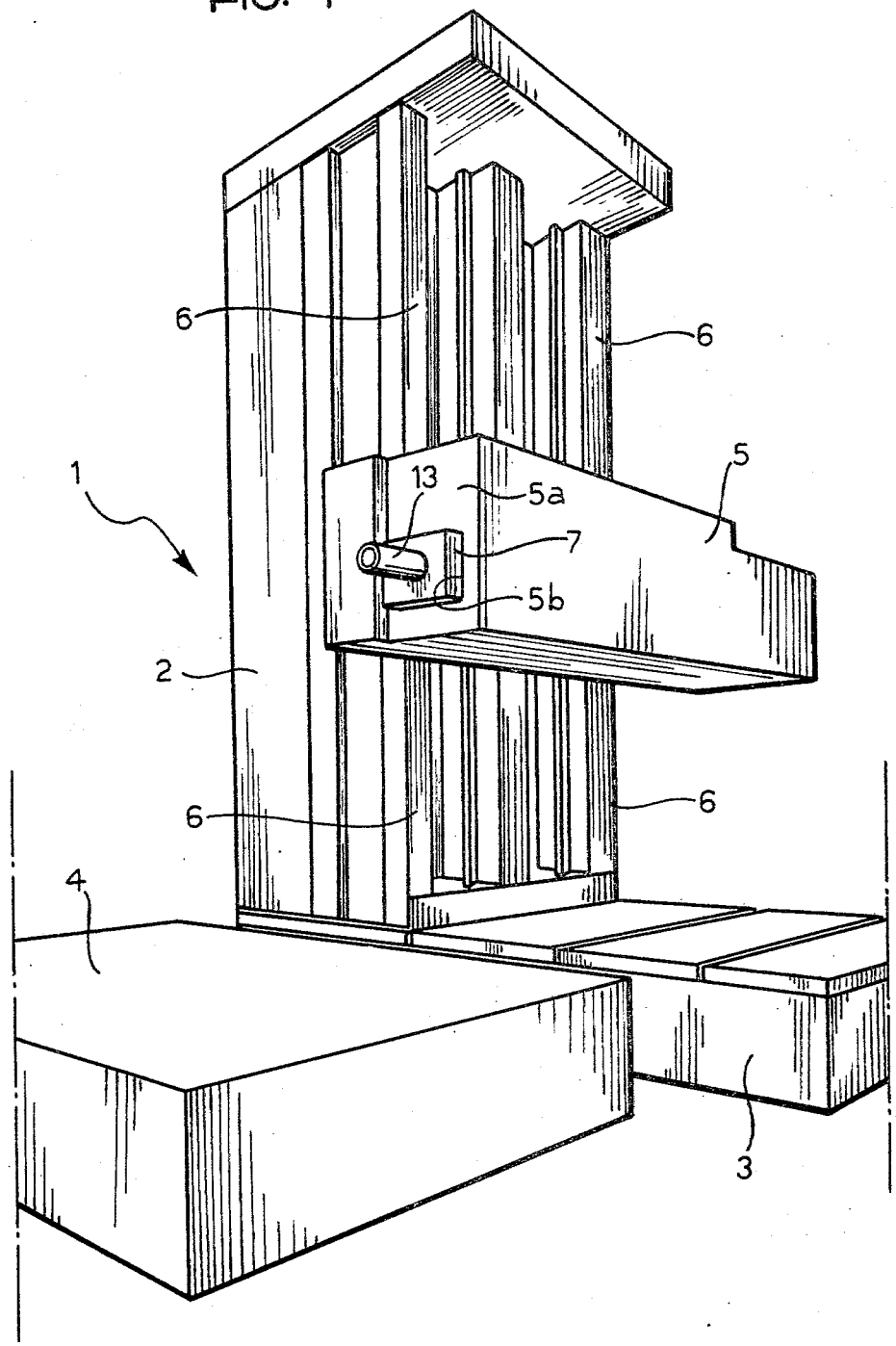
FIG. 1 is a schematic of the milling-boring machine in perspective according to the invention.

With reference to the above-mentioned figures, 1 shows a milling-boring machine according to the invention, which machine includes essentially an upright 2, which is horizontally adjustable along a base 3, on which it is mounted by conventional means and methods not shown. In FIG. 1, 4 shows schematically a clamping platform, abreast of the base 3, while 5 is a head supported by the upright 2 by means of the sliding connection with more than one vertical guide 6 formed in the upright. The head 5 is therefore vertically adjustable with respect to the upright and may be locked at the desired height by conventional means which are not shown.

Figure 2:
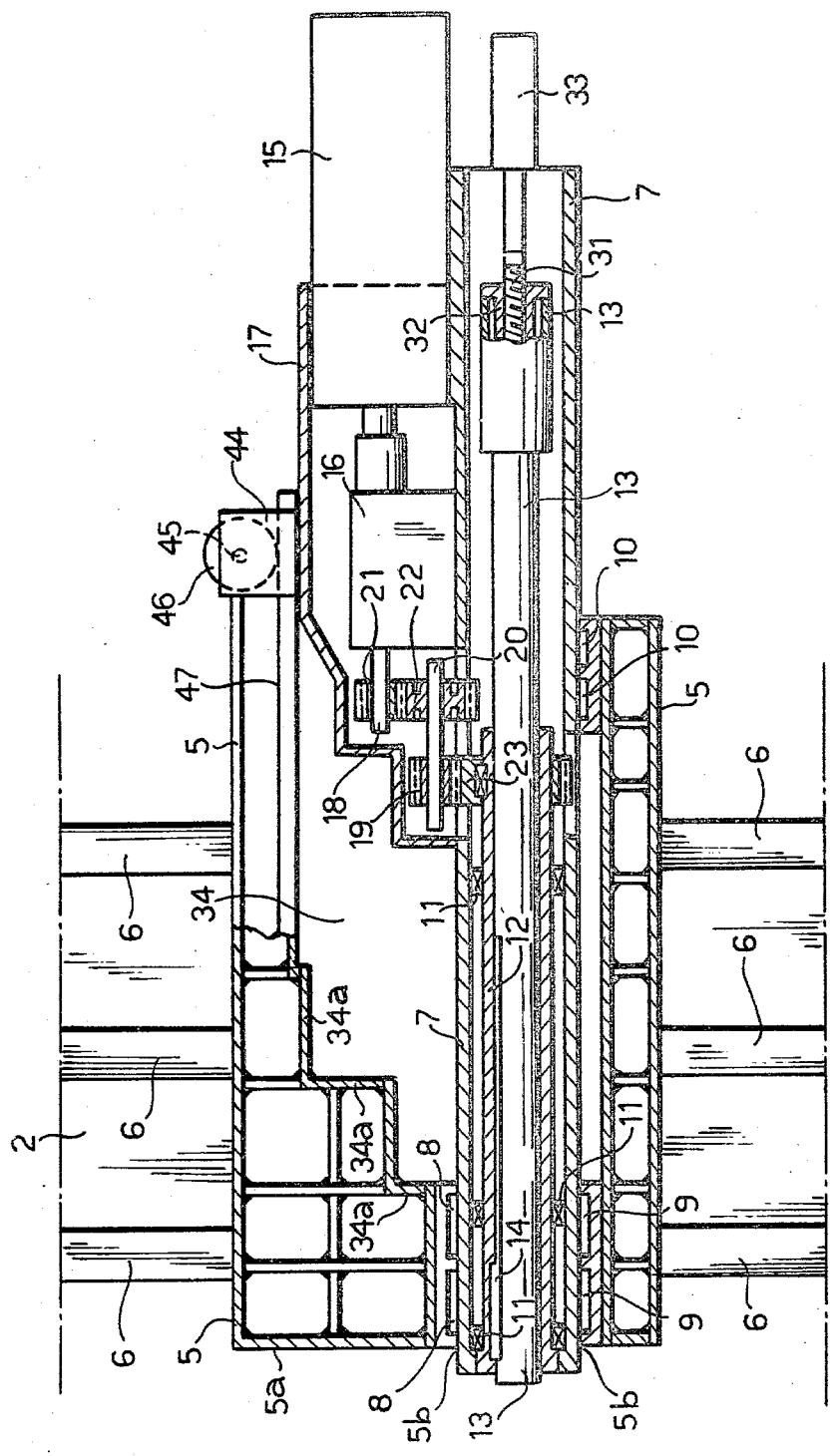
FIG. 2 is a schematic of the milling-boring head, utilized in FIG. 1, in vertical axial section.

With reference to FIG. 2, in the head 5 there is a tubular ram 7, horizontally and slide-mounted. This tubular ram, which has a square cross-section, slides along a number of hydrostatic sliding shoes 8,9,10, which guarantee the linkage of the ram, itself to the structure of the head 5, without play and with the maximum possible rigidity. The tubular ram 7 can be displaced, as described below, horizontally away from and toward the clamping platform 4, engaging through an opening 5b, made in the front wall 5a of the head. Internally and coaxially to the tubular arm 7, there is mounted, with the interposed bearings, each of which is shown as element 11, a tubular straight-line spindle 12, for milling tools (not shown). The spindle 12 can turn on its own longitudinal axis with respect to the tubular ram 7, while it is joined, by conventional means not shown, to the ram itself in its rectilinear axial movement away from and toward the face plate platform 4.

Internally and coaxially to the milling spindle 12, a boring spindle 13 is slide-mounted and is rotationally connected to the milling spindle 12 by means of a number of axial pins 14.

Behind and above the tubular ram 7 there are fixed the motor 15 and a gear box 16, contained in a protective casing 17, which is also attached to the ram 7. The drive shaft 18, coming out of the gear box 16, turns a gear wheel 19, supported by a shaft 20, through a kinematic chain schematically consisting of a pair of gear wheels 21,22 reciprocally engaged and respectively keyed on the drive shaft 18 and the shaft 20. The wheel 19 is engaged, with a predetermined transmission connection, with a gear wheel 23 which is coaxially keyed on the milling spindle 12. The motor 15 therefore furnishes the power of rotation of the milling spindle 12 and of the boring spindle 13 to which it is joined.

Figure 3:
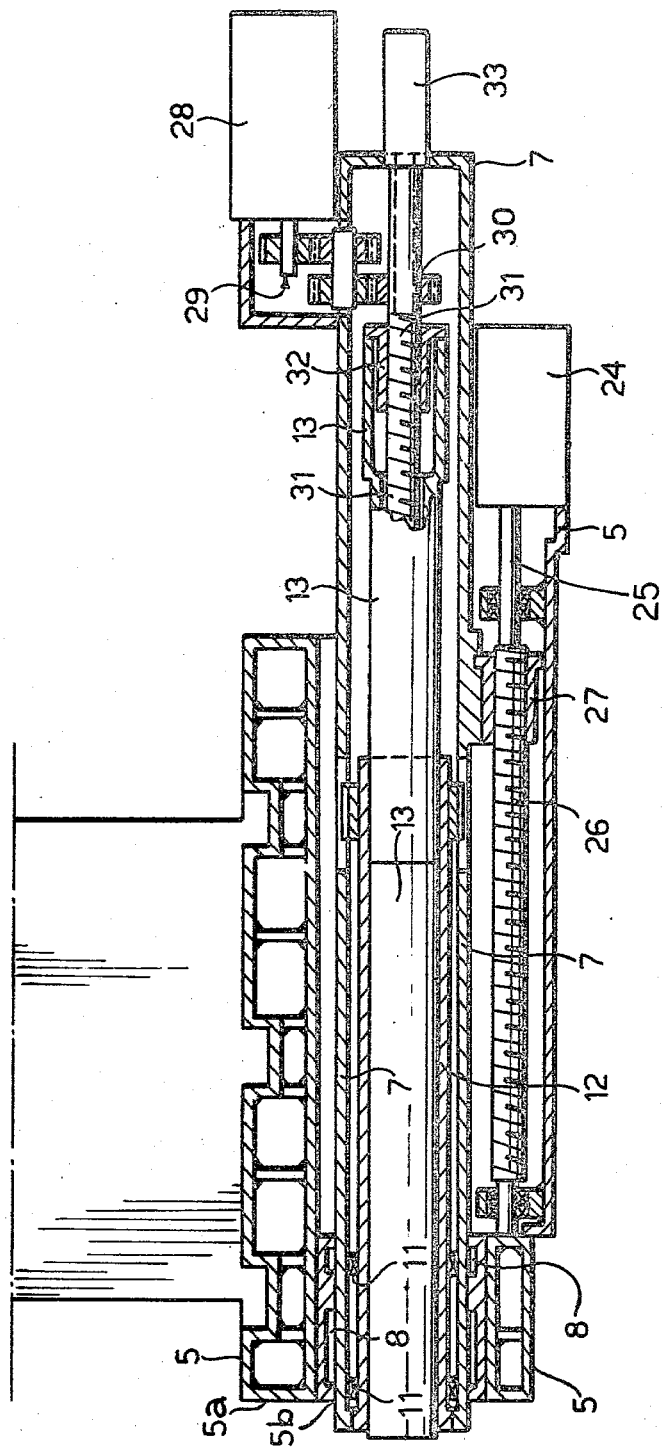
FIG. 3 shows the same head as in FIG. 2 in horizontal axial section.

With reference to FIG. 3, 24 schematically shows a motor attached to the head 5 in a position lateral to the tubular ram 7. This motor provides the rotation, by means of a kinematic chain globally indicated in 25, of a screw 26 of a predetermined pitch, extended parallel to the tubular ram 7, which screw is also rotational, supported with conventional means by the head 5. With screw 26 there is engaged a chuck 27 which is integrally joined to the tubular ram 7. Therefore, the motor 24 provides for the axial, straight-line displacement of the tubular arm 7, of the milling spindle 12 and of the drive system 15,16 and related kinematic devices, which are integrally joined to the ram.

In FIG. 3, 28 shows another motor supported behind and laterally by the tubular ram 7, driven by said motor using a group of kinematic devices globally schematized by 29, a gear wheel 30, which is coaxially keyed on the screw 31, which is rotationally supported with conventional methods by the ram 7.

This screw 31, which extends coaxially inside the hollow boring spindle 13, is engaged with a nut 32, which is integral in traverse to the said boring spindle 13, but neutral with respect to it. Therefore, the motor 28 which moves integrally with the ram 7, provides axial movements of the boring spindle 13 with respect to both the ram 7 and the milling spindle 12, away from and toward the clamping platform. Finally, element 33 shows a position transducer for counting the revolutions of screw 31 and stopping the motor 28 when the desired position of the boring spindle 13 is reached. This is done in a wholly conventional way.

In order to allow the desired axial movements of the ram 7, a cavity 34 is provided in head 5, with such transverse dimensions as to permit the passage the casing 17 and of the motor 28, cited above, and having an axial length which is not less than the length of the maximum predetermined traverse of the tubular ram 7. The cavity 34 is delimited in front by a transverse wall 34a, having a profile which is essentially conjugate to the front profile of the casing 17. This wall 34a is separated from the front wall 5a of the head 5 by a stretch of predetermined length in accordance with the dimensions of the hydrostatic front sliding shoes 8, as calculated for a specific project in order to guarantee the desired support of the tubular ram 7.

The cavity 34 is accessible from the outside of the head 5 through an opening 5c, on one side of the head itself, which may be closed by means of a cover sheet 35 adopting conventional screwing methods.

Figure 4:
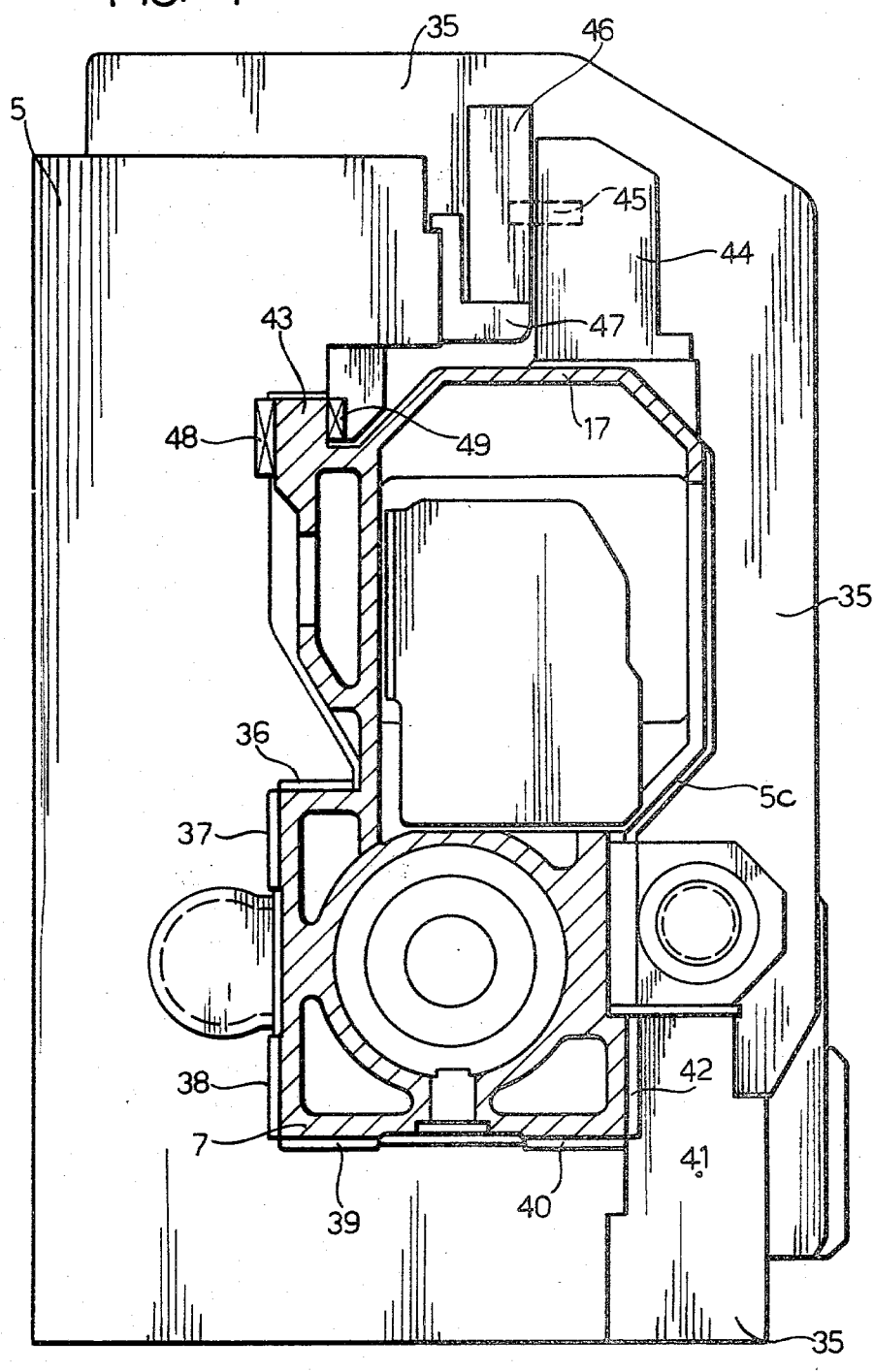
FIG. 4 is an enlarged scale cross-section along the line IV—IV of FIG. 2.

With reference to FIG. 4, in order to obtain the desired rigidity of the joined spindles 12,13 of ram 7 during the operation of the milling machine, especially when performing high power operations, the ram 7 is slidably supported from above on the head 5 by means of a number of hydrostatic guides schematically shown as 36,37,38,39, and 40. A heavy-duty clamp 41 is also utilized for the above-mentioned purpose, the clamp also being furnished with a hydrostatic guide 42. Also, in order to prevent the weight of the above-mentioned motors, and of the related kinematic devices, from resting completely on the guides of the tubular ram 7, the casing 17 is equipped above with a support 44 which, by means of a bolt 45, extending horizontally and perpendicularly to the axis of the tubular ram 7, sustains a neutral roller 46. This roller 46 travels on a rail 47 which is joined to the head 5 and which extends parallel to the direction of axial movement of the tubular ram 7. The roller 46 may be conventionally loaded by a force regulated, for example, by a spring or hydraulic cylinder (these are not shown), so as to regulate the force on the respective rail 47, and therefore, to regulate the proportion of the weight of the motor and related kinematic devices which the roller relieves from the hydrostatic guides of the tubular ram 7.

In further reference to FIG. 4, a flat guide 43 is shaped at the top and disposed lengthwise in casing 17, said guide being engaged in a sliding manner between hydrostatic sliding shoes 48, 49, parallel to the direction of axial movement of the tubular ram 7 and supported by the head 5. The engagement between the guide 43 and the sliding shoes 48,49 allows a desired stiffening of the entire movable system against eventual dangers of torsional oscillation.

I claim:

1. In a milling machine including a base, an upright element which is horizontally adjustable along said base, a clamping platform disposed adjacent the base, a machine head which is vertically adjustable along the upright element, a tubular ram mounted in the machine head, said tubular ram being adjustable transversely to the upright element, toward and away from the clamping platform, a milling tool spindle adapted to rotate around its longitudinal axis, said milling tool spindle being rotatably supported in the tubular ram with which it is integral in translation, and a drive means for rotating the milling tool spindle and for integrally moving the ram and spindle toward and away from the clamping platform, the improvement which comprises integrally mounting the drive means which is utilized for rotating the milling tool spindle on the tubular ram on the inside of a housing which is integrally connected to said tubular ram, said machine head being provided with a cavity which is open at the end opposite to the wall end facing the clamping platform and extends along the longitudinal direction of displacement of said tubular ram for a distance not less than the traveling distance of the ram with respect to the machine head, said cavity being provided with a cross section which allows the movement of the driving means and respective housing on the inside thereof, said machine head being provided with an aperture located in the end wall facing said clamping platform for passage of the operative end of the tubular ram, the inner sides of the aperture being provided with first guide means for receiving said operative end of the tubular ram and second guide means for the displacement of the tubular ram, said second guide means provided between at least one inside wall of said cavity and the counterfaced wall of said housing which is integrally connected to the tubular ram, said second guide means longitudinally extending over a length greater than that of the first guide means provided at the inner sides of said aperature.

2. The milling machine according to claim 1 wherein the machine head is provided with a plurality of hydrostatic support means provided for sliding engagement with the tubular ram.

3. The milling machine according to claim 1 wherein a rail means is supported by the machine head, said rail means extending substantially parallel to the direction of movement of the tubular ram, and an idle roller means is provided for operative engagement with said rail means, said roller means being supported by the housing.

4. A milling machine comprising a base, an upright element which is horizontally adjustable along said base, a clamping platform disposed adjacent the base, a machine head which is vertically adjustable along the upright element, a tubular ram mounted in the machine head, said tubular ram being adjustable transversely to the upright element, toward and away from the clamping platform, a milling tool spindle adapted to rotate around its longitudinal axis, and milling tool spindle being rotatably supported in the tubular ram with which it is integral in translation, a spindle for boring tools coaxially mounted in the tubular spindle for milling tools, and sliding axially with respect to the tubular spindle and integral with its rotation and a drive system for the axial movement of the spindle for milling tools toward and away from the clamping platform, wherein the drive system for rotation of the spindles and the drive system for moving the milling tool spindle is integrally mountedon the tubular ram moveable toward and away from the clamping platform, said machine head being provided with a cavity which is open at the end opposite to the wall and facing the clamping platform and extends along the longitudinal direction of displacement of said tubular ram for a distance not less than the traveling distance of the ram with respect to the machine head, said cavity being provided with a cross section which allows the movement of the drive system and respective housing on the inside thereof, said machine head being provided with an aperture located in the end wall facing said platform for passage of the operative end of the tubular ram, the inner sides of the aperture being provided with first guiding means for receiving said operative end of the tubular ram and second guiding means for the displacement of the tubular ram, said second guide means provided between at least one inside wall of said cavity and the counterfaced wall of said housing which is integrally connected to the tublar ram, said second guide means longitudinally extending over a length greater than that of the first guide means provided at the inner sides of said aperture.

* * * * *

UNITED STATES PATENT AND TRADEMARK OFFICE
CERTIFICATE OF CORRECTION

PATENT NO. : 4,226,561
DATED : October 7, 1980
INVENTOR(S) : Francesco C. Ramusino It is certified that error appears in the above—identified patent and that said Letters Patent is hereby corrected as shown below:

In the heading entitled "[73] Assignee":

Change "Innocento" to --Innocenti--.

Signed and Sealed this

Tenth Day of March 1981

[SEAL]

Attest:

RENE D. TEGTMEYER

Attesting Officer

Acting Commissioner of Patents and Trademark